United States Patent [19]

Doner

[11] Patent Number: 5,657,487
[45] Date of Patent: Aug. 12, 1997

[54] MOBILE TELEPHONE LOCATION PROCESS MAKING USE OF HANDOFF DATA

[75] Inventor: John R. Doner, Sebastian, Fla.

[73] Assignee: AirNet Communications Corporation, Melbourne, Fla.

[21] Appl. No.: 462,016

[22] Filed: Jun. 5, 1995

[51] Int. Cl.$^6$ ............................................. H04Q 7/36
[52] U.S. Cl. .................. 455/456; 455/440; 455/441; 340/995; 342/457; 364/443
[58] Field of Search .......................... 455/33.1, 54.1, 455/56.1, 33.2, 67.1, 226.1, 226.2; 379/59, 60; 342/457, 458; 340/995, 988; 364/449, 443, 444

[56] References Cited

U.S. PATENT DOCUMENTS

| | | | |
|---|---|---|---|
| 3,419,865 | 12/1968 | Chisholm | 455/54.1 |
| 4,217,588 | 8/1980 | Freeny, Jr. | 343/112 D |
| 5,023,900 | 6/1991 | Tayloe et al. | 379/32 |
| 5,055,851 | 10/1991 | Sheffer | 342/457 |
| 5,208,756 | 5/1993 | Song | 364/449 |

FOREIGN PATENT DOCUMENTS

| | | |
|---|---|---|
| 631453 | 12/1994 | European Pat. Off. . |
| 0044929 | 2/1990 | Japan . |

OTHER PUBLICATIONS

Junius, "Intelligentes Radio Resource Management Mustererkennung mit GSM–Funkmebdaten und Anwendung", Sep. 1993, pp. 487–501.

Junius, "New Methods for Processing GSM Radio Measurement Data: Applications for Locating, Handover, and Network Management", Jun. 1994, pp. 338–342.

Song, Han–Lee, "Automatic Vehicle Location in Cellular Communications Systems", IEEE Transactions on Vehicular Technology, vol. 43, No. 4, Nov. 1994, pp. 902–908.

Kennedy, et al., "Direction Finding and Smart Antennas Using Software Radio Architectures", IEEE Communications Magazine, May 1995, pp. 62–68.

*Primary Examiner*—Reinhard J. Eisenzopf
*Assistant Examiner*—Lee Nguyen
*Attorney, Agent, or Firm*—Hamilton, Brook, Smith & Reynolds, P.C.

[57] ABSTRACT

A system for determining the location of a mobile station based upon measurable mobile data values such as those provided by mobile-assisted handoff (MAHO) procedures. The mobile stations make signal strength measurements of nearby base stations and return that information to the serving base station. A timing advance necessary to synchronize the mobile may also be determined. The signal strength measurements and the timing advance data then provide information to map to an estimated vehicle location. Since the mobiles are assumed to measure signal strength discretely, there may be several consecutive positions along a road which return identical mobile data. The road is thus segmented into constant segments which are consecutively indexed, and an association is established between the associated mobile data vector and the index. The process for location of a mobile consists of first finding the road for the mobile unit, then finding the position along the road. The mobile vector is sequentially input into a look up table or neural networks (one for each road in the sector) until an output coordinate pair actually lies near the corresponding road. From that point on, the input vector provides an index to a constant region along the road, so the mobile is unambiguously located as to which road, and to which segment along the road it occupies.

10 Claims, 8 Drawing Sheets

MOBILE TELEPHONE LOCATION PROCESS MAKING USE OF HANDOFF DATA

FIELD OF THE INVENTION

This invention relates generally to communication systems, and in particular to determining the location and speed of a mobile station in a wireless communication system such as a cellular telephone system.

BACKGROUND OF THE INVENTION

The ever increasing demand for wireless communication such as Cellular Mobile Telephone (CMT), Digital Cellular Network (DCN), Personal Communications Services (PCS), and the like, are giving rise to a corresponding need for new value-added services. These include services such as personal mobility, where a single personal telephone number may be used to direct a call to an individual user, regardless of where they are located. Other proposed services would also require that cellular telephones provide physical position location information. For example, the United States Federal Communications Commission (FCC) is presently considering a requirement for cellular service providers to have technology in place within the next five years to pinpoint the location of callers within 125 meters (about 400 feet).

Such services would not only provide personal security in the event of an emergency, that is they would provide the local authorities who respond to "911" calls with immediate information concerning the location of the disturbance, but would also enable other services such as vehicle theft tracking and recovery as well as equipment security and fraud detection.

The cellular telephone industry has resisted serious efforts in implementing position location services to date, however. This may be due to several considerations. First, there is a general fear that the cost of implementing such a system is high and that the required technology is unproven. For example, existing location systems require special purpose hardware and software to be installed in the mobile unit. With millions of mobile units already in use, any system which requires the implementation of new mobile hardware is likely to be an expensive proposition.

There may also be historic reasons why previous attempts to implement position location services in cellular systems have been less than successful. In dense urban environments, man-made structures such as buildings, overhead highways and the like impose multi-path distortion at cellular radio frequencies. This, in turn, complicates the position location process making it difficult to meet the requested accuracy specifications.

DESCRIPTION OF THE INVENTION

OBJECTS OF THE INVENTION

It is an object of this invention to provide a position location and speed detection feature for a wireless communication system using existing wireless protocols, thereby eliminating the need for special purpose hardware to be installed in the remote unit.

Another object is to avoid the need for implementing new software, at least in the mobile unit, limiting the implementation to a change to the programming at the portion of the system under the control of the service provider, such as at a Mobile Telephone Switching Office (MTSO) and/or Mobile Switching Center (MSC).

Yet another object is to provide accurate determination of the position of a mobile unit in densely populated urban environments where the presence of many buildings and other structures might otherwise interfere with accurate position location.

A further object is to permit implementation of a value-added automatic vehicle location service without requiring large investments in new subscriber equipment or service provider hardware.

SUMMARY OF THE INVENTION

Briefly, the invention determines the location of a mobile station based upon measurable discrete-valued mobile data including signal strength data from multiple nearby base stations, and also including timing advance data from a serving base station. The mobile data values are used to divide the service area into contour regions. The mobile data values returned by the mobile station thus serve to define a position as an intersection of multiple contour regions over which each of the measured mobile data values are expected to remain constant.

In order to resolve possible ambiguities in situations, such as when a mobile unit moves near an obstruction, each contour region along a service area such as a road is given an index number, so that each position may be uniquely identified along the road.

More particularly, the invention is a wireless communications system, such as a cellular mobile telephone system, in which a mobile station periodically makes signal strength measurements of the radio signals received from multiple base stations other than the base station currently serving the mobile unit. The mobile unit reports these receive signal strength measurements back to the serving base station. In time division multiple access (TDMA) systems, the serving base station also computes a timing advance for the mobile station, which is normally used by the mobile unit to skew its radio transmissions in time.

These mobile data values, including signal strength measurements and timing advance information, are, for example, already typically available in accordance with the so-called Mobile Assisted Hand Off (MAHO) procedures in certain cellular systems such as the Global System for Mobile Communication (GSM).

The serving base station then uses the mobile data values to delineate a set of contour curves that divide the terrain covered by the wireless communication systems into regions. Each so-called constant region in the contour represents an area for which the mobile data values are expected to remain the same. Thus, as the mobile unit moves through the service area, it crosses a contour curve from one constant region into another constant region, thereby causing one or more of the mobile data values to change. The constant regions are predetermined to be small enough to provide a fix of the position of the mobile unit to a desired accuracy.

In other instances, there may be interfering buildings or other structures, especially in densely populated urban zones. As a mobile unit moves near such an obstruction, a rapid or substantial change in the measured signal level from a nearby base station typically occurs. The effect upon a mobile moving near a building is thus a momentary fade in one or more of the base station signal levels, with the signal level rapidly dropping while the mobile remains in the deep part, or "shadow" behind a building, and then rapidly rising back to its previous level once emerged from the shadow.

Because the invention forms contour regions depending upon variations in signal strength, the location accuracy of the invention actually improves in such areas such as densely populated urban environments where there are many possible obstructions.

However, the presence of obstructions does create possible ambiguities in the position location process. A procedure for locating a vehicle position according to the invention thus consists of two primary steps. The first step provides an approximation of the vehicle position by associating a set of (x,y) points in the service area with each possible set of mobile data values. The association may be made by table look up or by more sophisticated data mapping techniques such as neural networks. A second step in the procedure compensates the initial (x,y) estimate for the fact that two or more non-adjacent (x,y) points may return the same mobile data values. For example, the regions on opposite sides of a building shadow may be part of what would otherwise be a single constant region. In order to compensate for this possible ambiguity, the constant regions along a service area such as a road are labeled sequentially with an index number. The (x,y) position associated with each constant region is then associated with these index numbers, with the indexed mobile data sets thus serving to uniquely identify the mobile position based upon logical combinations of the last known position.

BRIEF DESCRIPTION OF THE DRAWINGS

The above and further features and advantages of the invention may be better understood by referring to the following description in conjunction with the accompanying drawings in which.

DETAILED DESCRIPTION OF A PREFERRED EMBODIMENT

Figure 1:
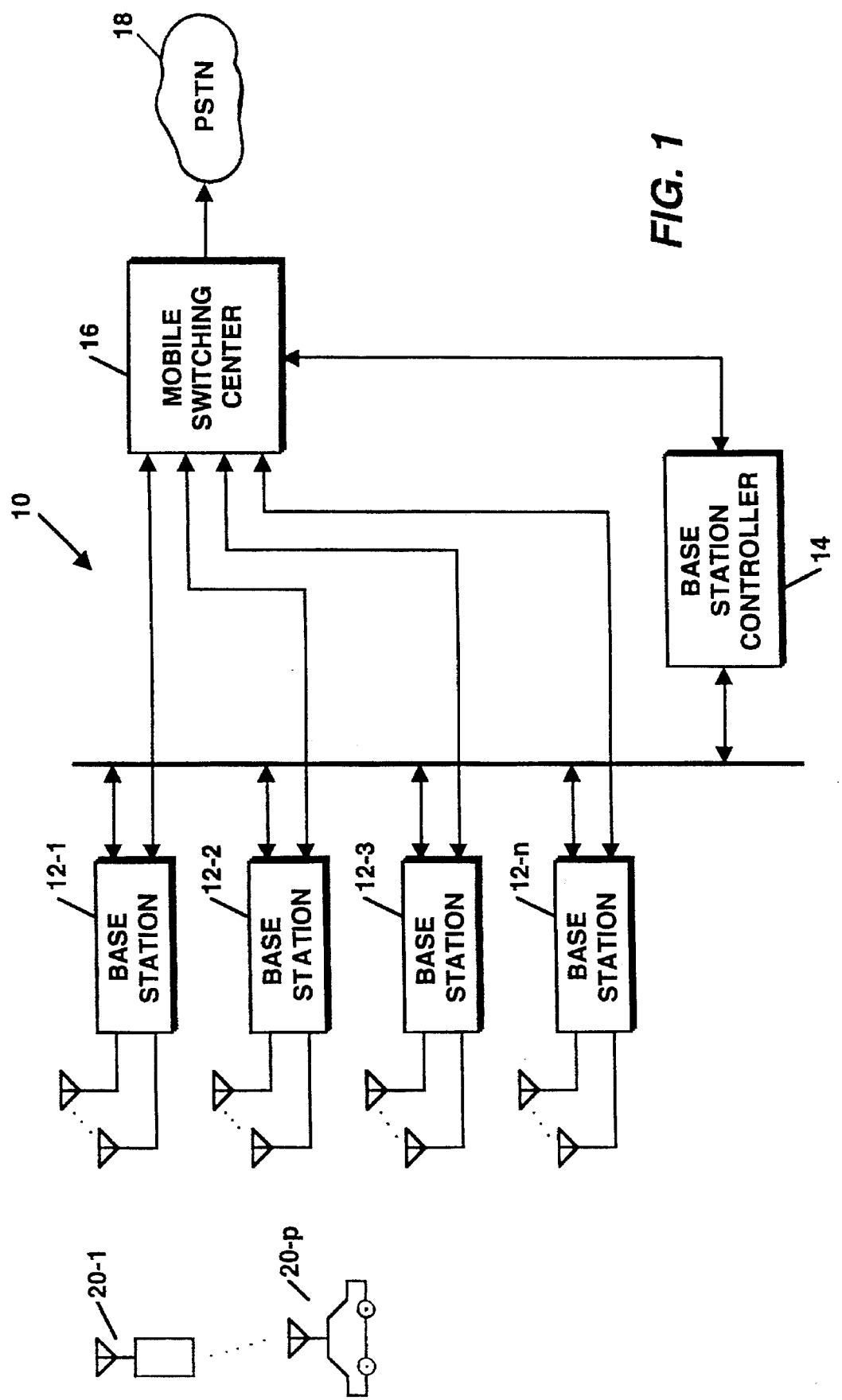
FIG. 1 is a block diagram of a wireless communication system in which a vehicle location process according to the invention may be implemented.

Turning attention now to the drawings, FIG. 1 illustrates a typical wireless communication system 10, such as one operating in accordance with the worldwide-deployed Global System for Mobile Communications (GSM) in which the invention may be advantageously employed.

The system 10 includes a plurality of sites for base stations 12 with each base station 12 being associated with a sub-area, or cell, of the geographical area assigned to the service provider.

A number of the base stations 12-1, 12-2, 12-3, ..., 12-n are arranged in a group, or cluster. A base station controller 14 and a mobile switching center 16 provide telephone signal connections between the base stations 12 in the cluster and a Public Switched Telephone Network (PSTN) 18. The system 10 thus permits mobile units 20-1, ..., 20-p to communicate with each other or with other devices that may be connected to the telephone network 18.

The base station controller 14 is also responsible for coordinating these connections by coordinating the operation of the base station 12 and the mobile switching center 16, for example, to set up the appropriate interconnection between the subscribers of the landline telephone exchange 18 and the mobile stations 20, in a manner which is well known.

Figure 2:
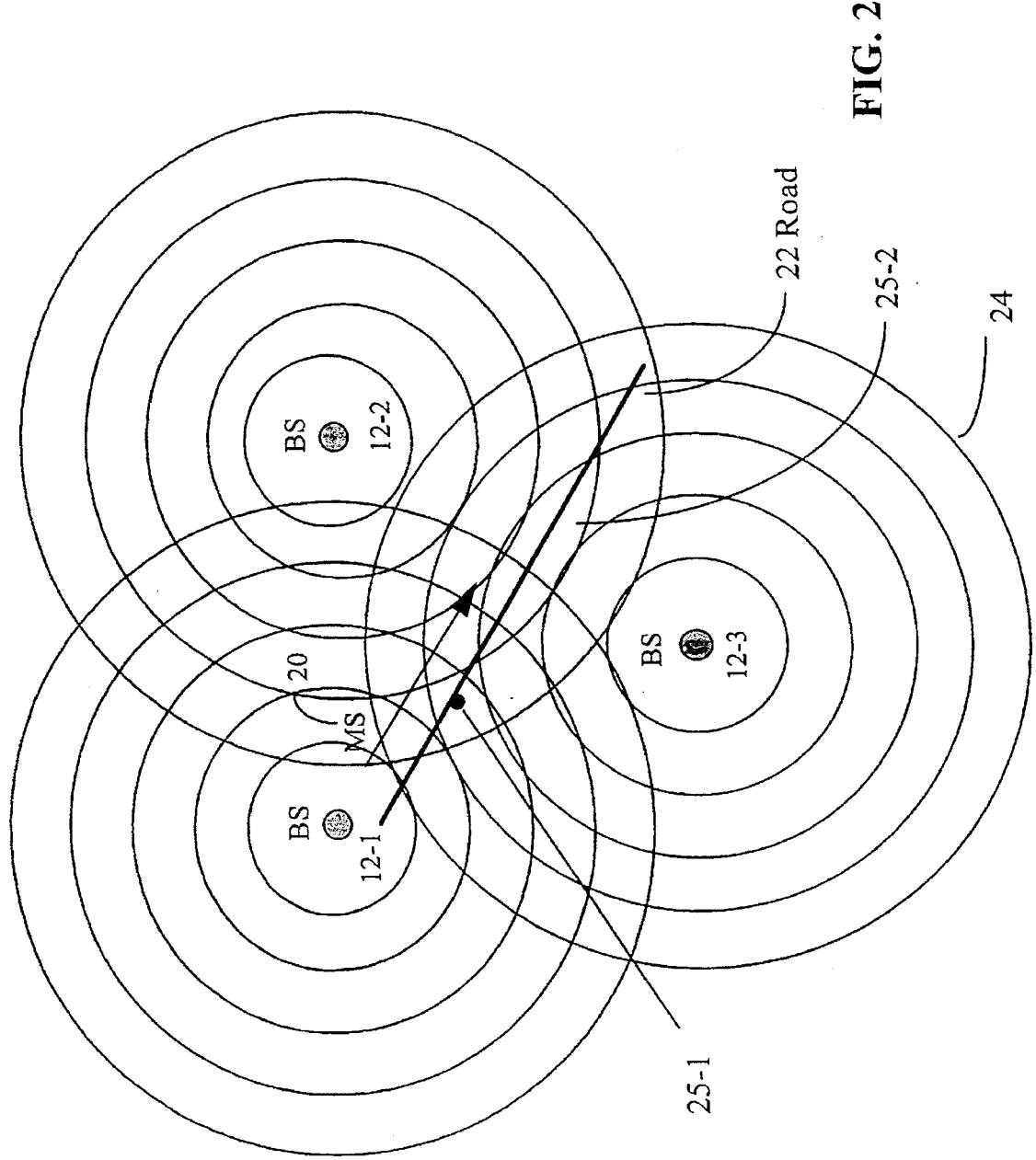
FIG. 2 is a diagram showing three adjacent base stations in a wireless network and several regions of constant mobile data values which may typically be defined therein.

FIG. 2 depicts a typical layout of adjacent base stations 12 within the cells, such as along a road 22. In order that a call may continue as a mobile station 20 moves along the road 22 from cell to cell, a procedure known as handoff, or handover, is performed. To accomplish handover, a base station, such as base station 12-1, monitors the quality of the radio link between the mobile station 20 and itself. In older analog systems, this is done by having the base station 12-1 itself measure a receive signal strength level. In newer digital systems, the mobile 20 measures and then reports a signal strength back to the base station 12-1.

When the base station 12-1 realizes that the signal quality has degraded to a point where the distance to the mobile 20 has become too large, it requests the base station 12-2, 12-3 in neighboring cells to report a power level that they see for the mobile 20. The base station 12 reporting the strongest power level is thus assumed to be closest to the mobile 20, and the mobile 20 is then commanded to perform frequency and timing change procedures so that the new base station 12-2 or 12-3 can assume control of the call.

Figure 3:
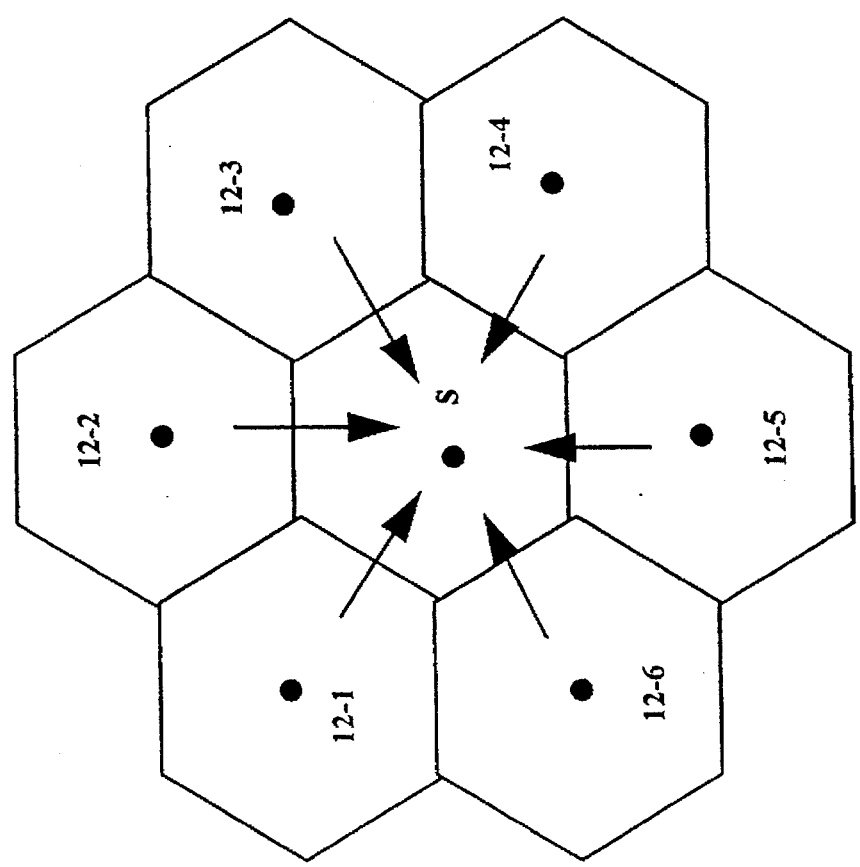
FIG. 3 illustrates a mobile station and several adjacent non-serving basestations.

In certain cellular systems, such as the GSM system, the mobile station 20 continuously monitors the received power level from multiple neighboring base stations 12-1, 12-2, 12-3, ..., 12-n. To do this, the base station presently controlling the mobile 20, such as base station 12-1, periodically transmits to the mobile unit 20 a list of the control channel radio frequencies in use by the other base stations 12-2, 12-3, ... 12-n. The mobile 20 then performs power level measurements on such control channels. The list of power levels measured by the mobile station 20 is then periodically returned to the controlling base station 12-1. As shown in FIG. 3, the number of adjacent basestations may be as many as six in a conventional seven cell (n=7) frequency reuse scheme. However, n may be some number less than the total number of surrounding base stations if desired.

A typical road 22, shown in FIG. 2 as a heavier line, passes through the coverage area of, for example, three base stations 12-1. 12-2. and 12-3. As the mobile station 20 travels along the road 22 it thus transmits information back to the serving base station, such as base station 12-1, to perform handover procedures. Such information includes data indicating the apparent signal levels received from other nearby base stations such as base stations 12-2 and 12-3. In addition, the serving base station. 12-1 computes a timing advance for the mobile station 20. This timing advance, in connection with the GSM protocol, is a data value directly proportional to the distance between the mobile station 20 and the serving base station 12-1, and is normally used to properly time the Time Division Multiple Access (TDMA) signal used in the GSM system. The set of mobile data values returned by the mobile 20 may be represented by a vector (t, $s_1, s_2, s_3, \ldots, s_n$) where t is the timing advance, and $s_1$ through $s_n$ are the measured base station signal levels for the serving base station and up to n−1 adjacent but non-serving base stations.

The circular lines 24 shown in FIG. 2 represent the boundaries between areas in which the observed power levels for a particular base station are the same, as discretely measured by the mobile station 20. Contour lines 24 superimposed on the terrain, such as shown in FIG. 2, can thus be considered to define a set of irregularly shaped constant regions 25 in which all of the mobile data values remain the same. For example, in a GSM system, a mobile station 20 may return digitally encoded signal strength values assumed to be within a precision of one (1) decibel (dB) and the timing advance information computed to an accuracy of 0.5 microseconds. Thus, even if the mobile unit moves to a different position, the mobile data values may not change.

As seen from FIG. 2, even when only three base stations are active in a particular area, these constant regions have an irregular shape and may be of varying sizes. These regions 25 of constant mobile data values, which will be called constant regions or constant segments herein, are small enough to provide a close fix of the position of the mobile 20 along the road 22. In particular, assuming a five (5) kilometer cell radius, the median size of a constant segment 25 will be approximately 20–30 meters along the road 22, with a maximum size being about 200 meters for any given segment, such as segment 25-2.

As the mobile station 20 moves along the road 22, it thus moves through multiple constant segments 25, and as the mobile 20 crosses any particular contour line 24, one of the mobile data values changes.

Figure 4:
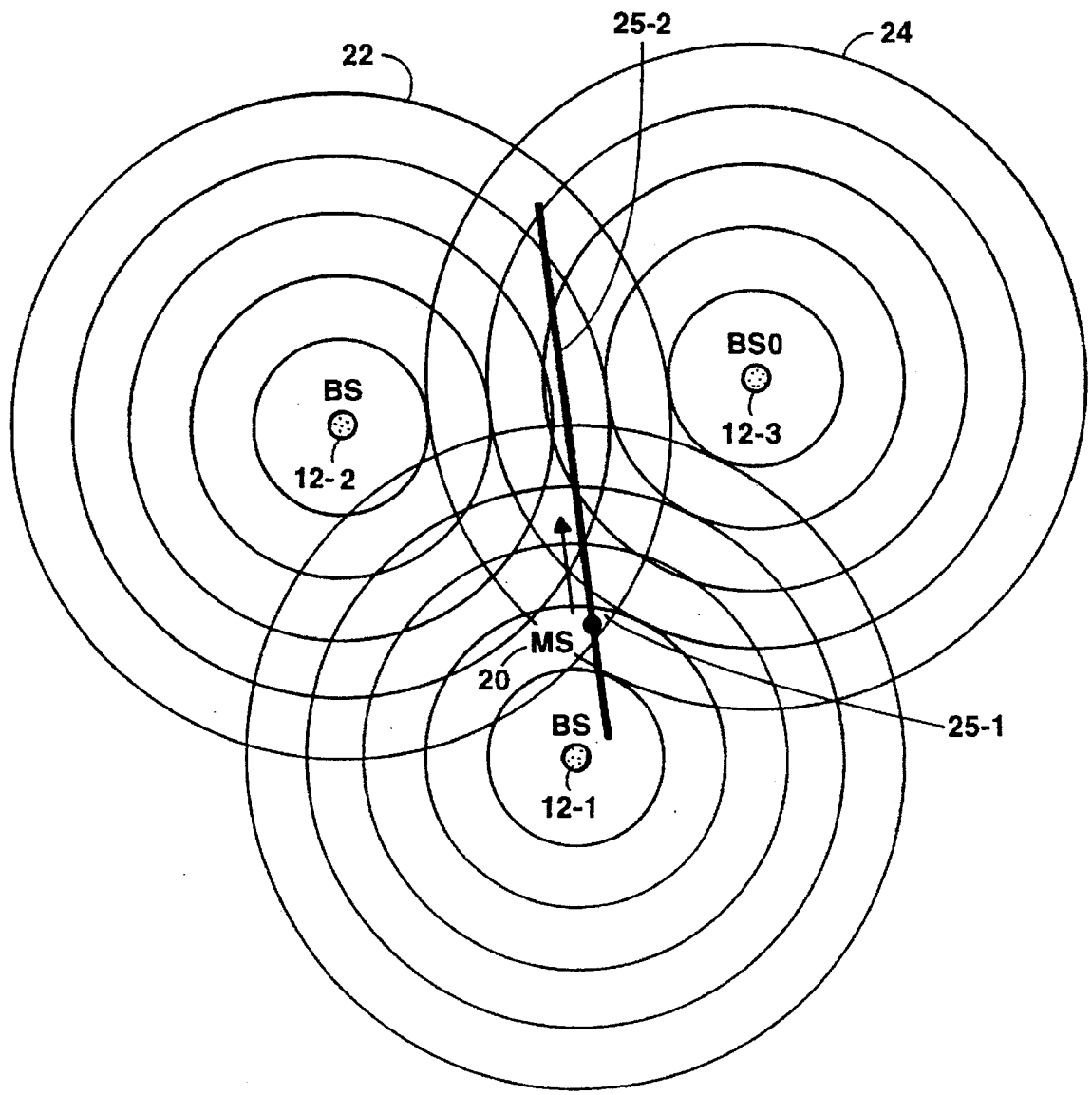
FIG. 4 is a detailed diagram showing the placement of surrounding cells adjacent a given road which provide mobile data values that can be used to divide the road into constant segments.
Figure 5:
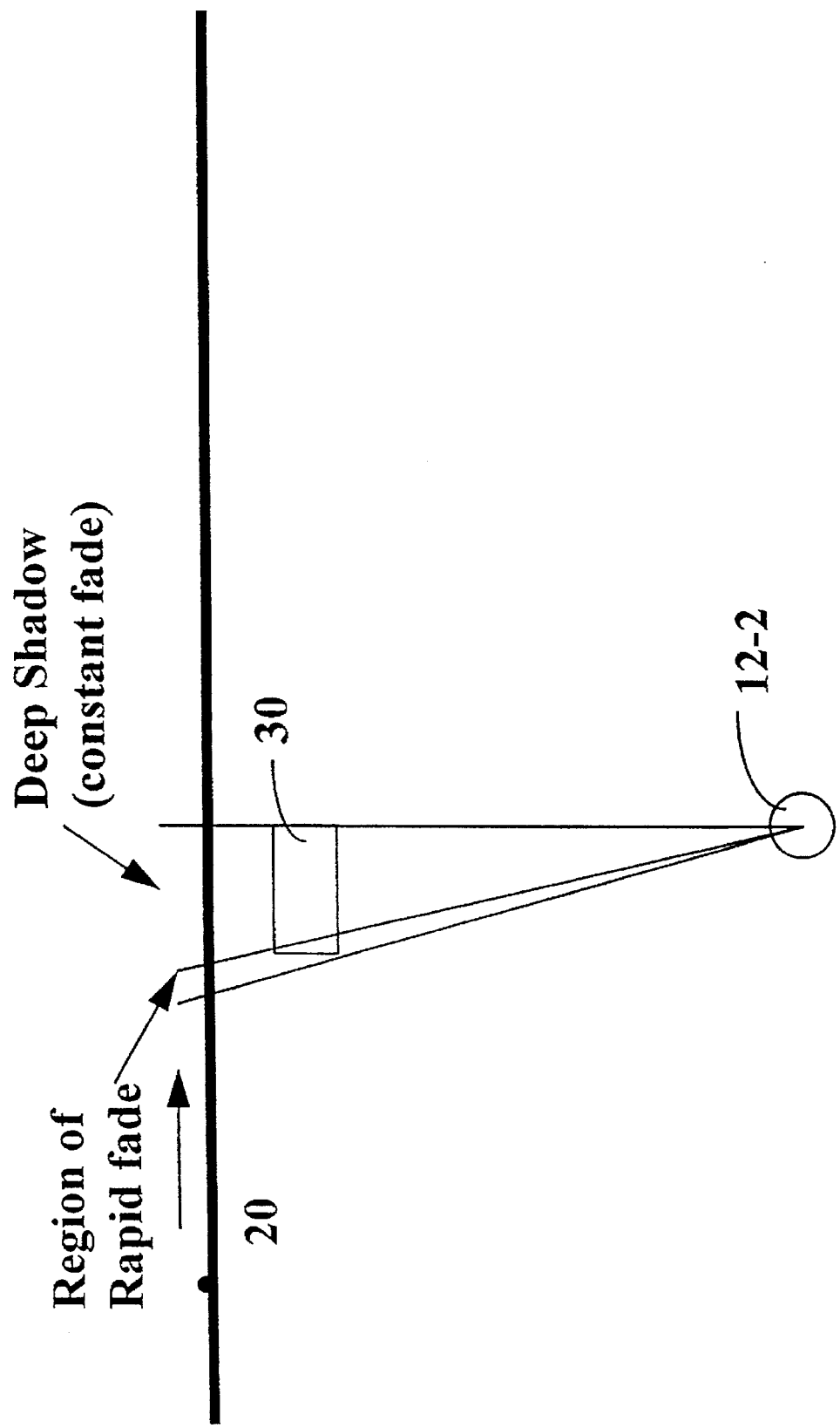
FIG. 5 illustrates the short-range shadowing effects of a building on the mobile data values.

FIG. 4 is a more detailed diagram showing the road 22 and a particular constant segment 25-2 associated with the road 22. In addition to the relatively small variation of signal strength and timing advance as a mobile station travels along the road 22, there are more significant signaling effects possible, such as those caused by buildings or other obstructions along the road 22. For example, as the mobile station 20 moves near an obstruction, such as that shown in FIG. 5, a rapid and substantial change in the measured signal level from one or more of the non-serving base stations, such as basestation 12-2, may occur. The effect of this motion near a building 30 may be to create a fade in one or more of the signal levels, with the signal level rapidly dropping by a large amount, such as by 5 or 10 decibels (dB), and then staying at that attenuated level while in the deep part of the building shadow, and then rapidly rising back to the previous level once on the far side of the building 30.

The location of buildings therefore creates additional constant segments 25 along a particular road 22. The present invention further discriminates the position of a mobile station 20 using an essentially two-step process, with the first step determining an approximate position, and the second step refining the first approximation to conform to the known constant region topology.

The first process essentially capitalizes upon the fact that for any point located within the cellular service area, the expected values of the signal strengths that would be detected by any given mobile station 20, and the timing advance required for the mobile station 20 by the serving base station 12-1 will be more or less unique. Thus, having associated signal strength vectors with a position, the position can be determined knowing the signal strengths.

Theoretical area signal strength models usually provide calculated signal levels which may be in error by as much as 10 dB relative to specific points in the area. Thus, such models are typically inadequate to determine mobile station location based upon the application of closed form analytical models to specific cellular layouts. Instead, signal strength data is preferably determined by collecting actual signal strength measurements taken along a road of interest such as road 22 within a cell. The measured data is then associated in a vector form with positional point sets which have been collected. This leads to a set of relationships $$(t, s_1, s_2, \ldots s_n) \to (x, y)$$

for the set of points (x,y) along each road 22 of interest, where t is the timing advance, and $s_1 \ldots s_n$ are the measured signal strengths as before. Thus, given a vector set of vector data measurements, a position along the road 22 may be determined.

Figure 6:
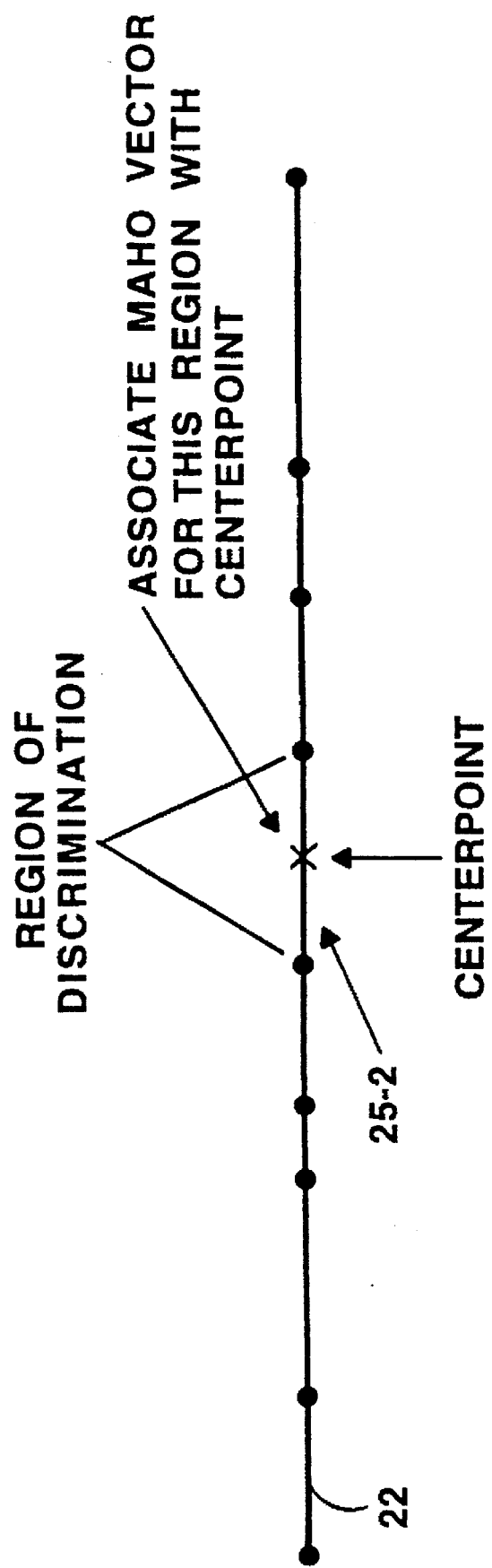
FIG. 6 is a diagram illustrating the region of discrimination within a constant segment.

These mobile data values are typically collected in the GSM system during part of a Mobile Assisted Hand-Over (MAHO) procedure performed by the base stations 12 in conjunction with the basestation controller 14; the vector data will thus be referred to herein as the MAHO vector. Once the MAHO vector is available for a mobile station 20, the MAHO vector can be processed, such as by performing a table look-up, or by a neural network, to associate the MAHO data vector with one of the constant regions along the road, with the only limitation being that as in FIG. 6, any given (x,y) point associated with an MAHO vector known only to a level of certainty that depends upon the size of the current constant segment 25.

In the case of small fading regions due to a building or other small obstructions along the road 22, the MAHO vector values may vary in several relatively large increments. The constant segments 25 in such locations could be as small as one meter, for example. In order to accommodate this possibility of rapid variations of very small length, preferably the system accepts and stores constant segments 25 along each road 22 of a minimum length, such as 10 meters. In this way, a building shadow, of a minimum 10 to 20 meters long, will provide a constant segment 25. As a result, the accuracy of the position location actually improves, and very short term signal strength variations occurring as a vehicle enters a building shadow will be rejected.

The above procedure thus appears to resolve the location of a mobile station 20 to a particular constant segment 25 along the road 22. However, the required analysis is complicated by the fact that two non-contiguous constant segments, 25 may actually return the same MAHO vector. For example, two regions on the opposite side of a building shadow, which would be part of a signal constant region if the shadowing obstruction were not present, may provide the same MAHO vectors.

Thus the MAHO vector itself is not sufficient to uniquely locate a mobile vehicle along the road 22, and additional information is needed to resolve the ambiguity. This invention resolves this ambiguity by labeling the constant segments 25 along a particular road 22 with a sequential index number, starting at one end of the road 22. Thus, each segment 25 is also associating with a four element vector (I, $R_x$, $R_y$, $R_y$, $P_i$) where I indicates the index of the constant segment 25 along the road 22, ($R_x$, $R_y$) represents a point separating the (Ith) and the (I+1st) constant region 25 along the road 22, and $P_i$ (where $P_i$ is greater than 1) is the index of the next constant segment along the road with the same MAHO vector, or $P_i$ set to zero if there is no such constant segment. These four element vectors, referred to herein as the road point, or RP vectors, serve to index the constant segments 25 from one end of the road 22 to another, so that positioned ambiguities can be identified exactly assuming the mobile 20 is travelling along the road 22.

In order to provide a unique association of MAHO vector data to a vehicle position, a second process is required. In particular, an MAHO vector corresponding to one or more constant segments 25 is associated with another three element vector, or triple:

$$(t, s_1, \ldots, s_n) \rightarrow (x_i, y_i, i)$$

where $(x_i, y_i)$ is the end point of the first constant segment 25 along the road 22 producing the associated MAHO vector, and i is the index of the first constant segment 25 along the road 22 producing the associated MAHO vector. The three element vectors are called output vectors.

Figure 7:
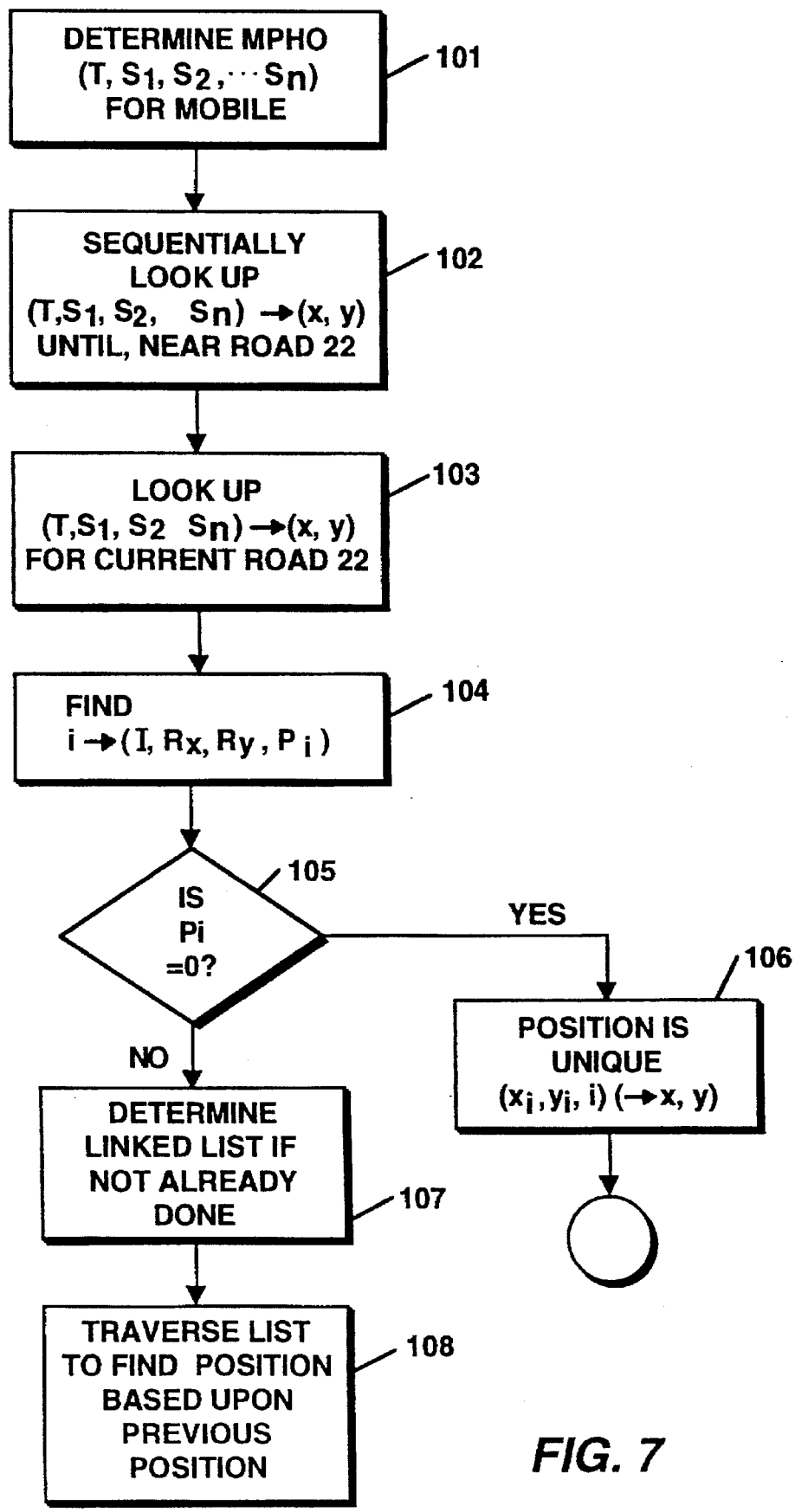
FIG. 7 is a flowchart of the operations performed in determining the location of a mobile unit.

The process for determining uniquely where a vehicle is located along the road thus consists of several steps. As shown in FIG. 7, in the first step 101, the MAHO data vector is collected from the mobile unit 20. The MAHO vector is then sequentially applied to all position maps for the service area until an (x,y) position is found near the road 22, in step 102. This association of a position to $(t, s_1, s_2, \ldots s_n)$ may only be done by a look-up table, or by more sophisticated neural network algorithms.

After the road 22 is so identified, a second lookup is done, in step 103, to obtain the output vector $(x_i, y_i, i)$ which denotes the first possible constant segment 25 occupied by the mobile 20.

As a next step 104 in the process, the index i obtained in step 103 is used to examine the associated RP vector $(I, R_x, R_y, P_i)$. If the associated $P_i$ is 0, then the set of the constant regions in a linked list of constant regions 25 associated with the particular (x,y) is determined as $(x_i, y_i)$, in step 106. However, if $P_i$ is not zero, then more than one segment along the road 22 may be the current position. In step 107, a set of constant segments 25 in a linked list is determined for the $(x_i, y_i, i)$ by examining the vector. The linked list is constructed by examining $(i, R_x, R_y, P_i)$ to obtain a value, J, equal to $P_i$, and then examining the vector $(J, R_x, R_y, P_j)$ to obtain a value equal to $P_j$, and so forth, until a vector $(k, R_x, R_y, P_k)$ is reached for which $P_k=0$. The linked vector list is then traversed as required to resolve the ambiguity associated with the MAHO vectors, by using information as to the previous position of the mobile, in step 108, if more than one constant segment is found.

The above technique provides an estimate of vehicle location which is resolved to an accuracy of approximately one half the size of the longest constant segment 25 along the road 22. Under certain assumptions, this is good enough to permit location of a mobile station 20 similar to that provided by certain much more complicated hardware-based triangulation techniques now being proposed. However, it is also possible to improve this location process and to more accurately track a vehicle in motion, by taking into account the number of times a vehicle-mounted mobile station 20 returns a signal from within each constant segment it crosses.

Figure 8:
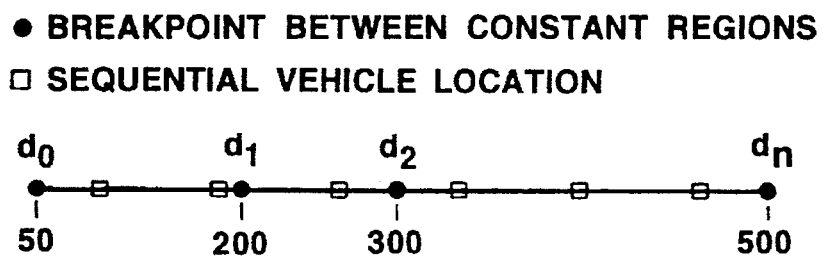
FIG. 8 is a diagram showing breakpoints between constant segments along a road.

In particular, FIG. 8 illustrates the status of certain information available concerning mobile station location. Along the road 22 are breakpoints do, $d_1, \ldots, d_n$ representing the positions at which transitions in the values of MAHO data vector take place. In addition to the position resolution process in FIG. 7, the base station 12-1 thus may also accumulate an occupancy count, $N_i, \ldots$ for each constant segment 25-i, where $N_i$ is a value indicating the number of times a particular MAHO vector is periodically returned from the mobile station 20 while it was in a particular constant region 25-i.

Given this occupancy information, a velocity for the vehicle may thus also be estimated. For example, assume time t=0, the mobile 20 is at an unknown point $(X_o)$ in a constant region 25-i along the road 22, moving to the right along the road 22 such as shown in FIG. 8 at an unknown velocity, V. (Note that since the road 22 is one-dimensional, a single variable $X_0$ can be used to denote a position.) Also, assume that the mobile 20 unit has been returning MAHO vectors data at regular intervals of time, T, although this is crucial to the determination below. Then, the occupancy counts $N_i$ for each constant segment 25-i place restrictions on the possible values of $X_0$ and V for the mobile 20. In particular, if N is the number of constant segments 25 along the road 22, and, for i=1, 2, ..., N, if the integers $m_i$ are defined by $$m_i = \sum_{j=1}^{i} n_j,$$

then the integers $m_i$ provide cumulative counts of the number of MAHO vectors reported back along the road 22 from an initial position $m_0$. Then, $(X_0, V)$ must satisfy the following inequalities:

$$X_0 \geq d_0$$
$$X_o + Vt(m_1 - 1) < d_1, \quad X_0 + Vtm_1 \geq d_1,$$
$$X_o + Vt(m_2 - 1) < d_2, \quad X_0 + Vtm_1 \geq d_2,$$
$$\vdots$$
$$X_0 + Vt(m_N - 1) < d_N, \quad X_0 + Vtm_N \geq d_N.$$

Figure 9:
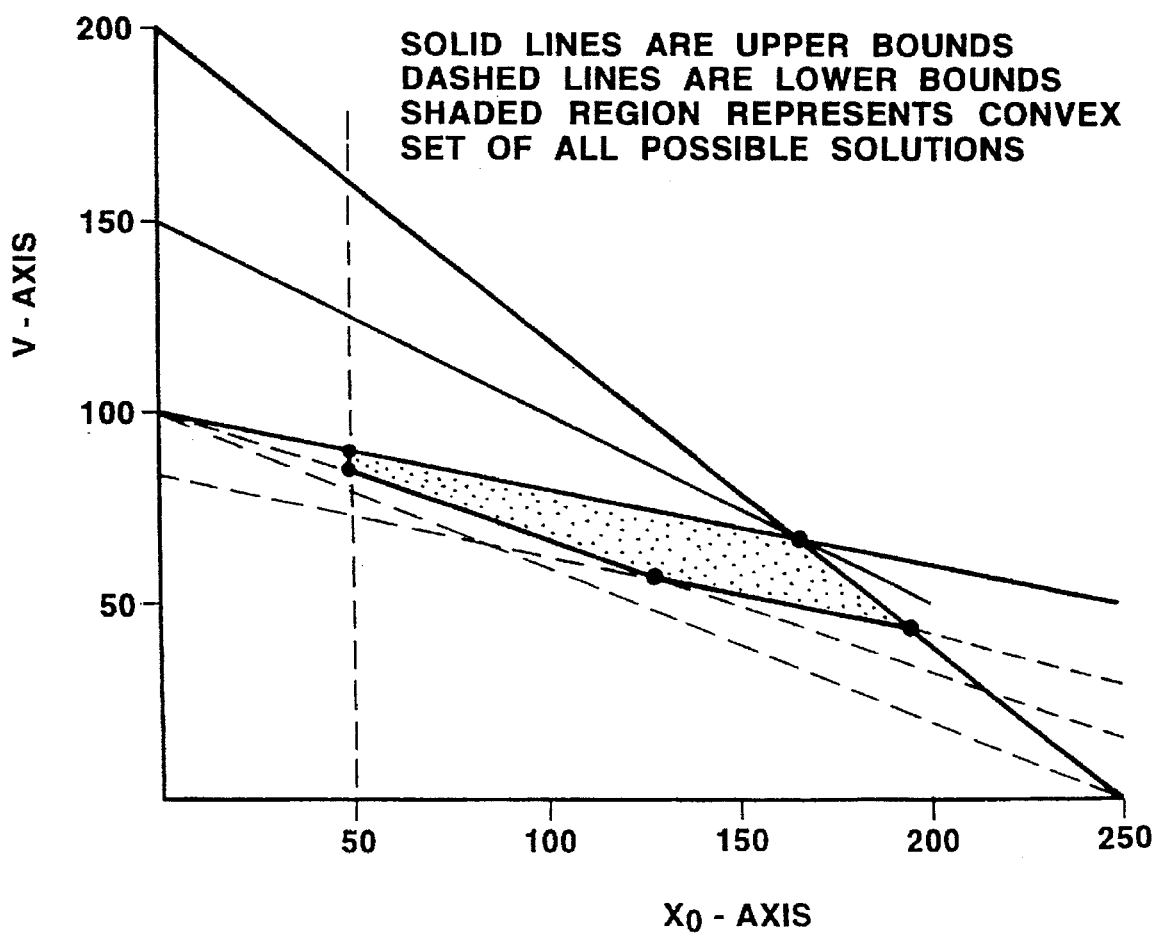
FIG. 9 is a diagram showing a solution space for determining a position along the road and a velocity.

These inequalities can be expressed as upper and lower bounding lines in a Cartesian plane containing all possible pairs $(X_0, V)$, and a region of the plane below all upper bounds and above all lower bounds will then represent precisely the set of all solutions $(X_0, V)$ which can actually simultaneously satisfy all inequalities. A diagram of the solution space for a specific example is depicted in FIG. 9, showing the upper bounds as solid lines, and the lower bounds as dashed lines. The region of the plane which satisfies all of the inequalities is necessarily a convex region bounded by some of the lines, and is therefore a polygon. This region normally contains a continuum of possible solutions $(X_0, V)$, but a single estimate reflecting a mean value of all possible solutions, if they are equally likely, is the centroid of the solution region, which can be obtained by taking the average of the vertices of the bounding polygon.

As the mobile 20 vehicle moves along a road 22, then the occupancy count $N_i$ for each constant segment 25-i can be determined from the MAHO data collected, which in turn is used to provide a velocity estimate.

What is claimed is:

1. In a wireless communication system in which a service area is divided into cells, and in which a road is located within the service area, a position determining apparatus comprising:

a mobile station, for providing communication to a remote subscriber of the wireless communication system;

a serving base station, for serving the mobile station located in one of the cells, and for accepting information representing a signal strength for a communication channel between the mobile station and the base station, as well as for accepting information representing signal strengths for communication channels between the mobile station and other, non-serving base stations, and for forming a mobile data vector from the signal strengths information for the serving and non-serving base stations; and position determining means, for accepting the mobile data vector from the base station and determining the location of the mobile unit as indicated by a position data set, the position determining means further comprising mapping means that associates a set of mobile data vectors with the road, with a single mobile data vector associated with a constant segment of the road along which the mobile data values remain constant, and wherein the mapping means associates identical mobile data vectors with two or more constant segments along the road, and wherein an index data value is also provided by the mapping means with each position data set, the index value thus identifying a constant segment along the road; and whereby the position determining means additionally maintains information concerning a last known position for the mobile unit along the road, and compares the last known position to the position data set including the constant segment index to uniquely identify the position of the mobile unit to one of the constant segments along the road.

2. A method for determining the location of a remote unit within a service area covered by a wireless communication system, the method comprising the steps of:

(a) collecting a data vector having two or more data elements that vary according to the position of the remote unit, the values of the data elements being identical for at least two location sub-portions, or constant segments, of the service area;

(b) using the data vector to determine an initial position estimate in the form of an initial position (xi,yi);

(c) using the initial (xi,yi) position to determine a segment index, i, that denotes a possible constant segment associated with a particular feature of the service area;

(d) using the segment index i to determine an associated point vector (i, Rx, Ry, Pi) with Rx, Ry representing a first point in the service area associated with the constant region, and with Pi representing the sequential index of another constant segment associated with the same particular feature of the service area, and with the sequential index Pi being set to zero if there are no other such other constant segments;

(e) if Pi as determined in step (d) is zero, then indicating that the position of the remote unit as (xi,yi);

(f) if Pi as determined in step (d) is not zero, then creating a list of position point vectors by the steps of:

(i) selecting the point vector (i, Rx, Ry, Pi) as a first element of the list;
(ii) setting a last sequential index to Pi;
(iii) determining an index, j, of a next point vector from the last sequential index;
(iv) using the index j to determine a next point vector (j,Rx,Ry,Pj)
(v) setting the last sequential index to Pj; and
(vi) repeating steps (iii) through (vi) until a point vector, k, is reached for which Pk=0; and (g) indicating the position of the remote unit by selecting one of the (Rx, Ry) points selected from among the k point vectors by traversing the list of position point vectors.

3. A method as in claim 2 in which the data vector collected in step (a) includes signal strength information measured at the remote unit from two or more base stations in the wireless communication system.

4. A method as in claim 3 in which step (c) of determining the segment index is performed by the steps of:

before step (a), labeling each of the constant segments associated with the particular feature of the service area with a unique segment index.

5. A method as in claim 3 wherein in step (c) the particular feature of the service area is a road.

6. A method as in claim 3 wherein in step (d) the elements Rx, Ry of the point vector indicate a point between the constant segment having index i and the constant segment having the next index, i+1.

7. A method as in claim 3 wherein in step (g) the position of the remote unit is selected from among the k point vectors by considering information as to the previous known position of the remote unit.

8. A method as in claim 2 in which the data vector collected in step (a) includes timing advance information measured at least one of several base stations in the wireless communication system.

9. A method as in claim 2 in which the wireless communication system uses the Global System for Mobile Communications, GSM, protocol, and the data vector is a mobile assisted hand-off, MAHO, data vector.

10. A method as in claim 2 wherein the initial position estimate (xi, yi) in step (b) is determined by performing the steps of:

before step (a), collecting actual signal strength measurement data as the data vectors that vary according to the position of the remote unit, and recording the actual signal strength data vectors and associated positions in an initial position estimate table; and in step (b), determining the initial position estimate by examining the initial position estimate table to find the position (xi, yi) associated with the data vector collected in step (a).

* * * * *